(12) United States Patent
Dale

(10) Patent No.: US 9,744,973 B2
(45) Date of Patent: Aug. 29, 2017

(54) ON-BOARD VEHICLE CONTROL SYSTEM AND METHOD

(71) Applicant: Jaguar Land Rover Limited, Coventry (GB)

(72) Inventor: Martin Dale, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 282 days.

(21) Appl. No.: 14/389,479

(22) PCT Filed: Mar. 27, 2013

(86) PCT No.: PCT/EP2013/056509
§ 371 (c)(1),
(2) Date: Sep. 30, 2014

(87) PCT Pub. No.: WO2013/144199
PCT Pub. Date: Oct. 3, 2013

(65) Prior Publication Data
US 2015/0066247 A1    Mar. 5, 2015

(30) Foreign Application Priority Data
Mar. 30, 2012    (GB) .................................. 1205674.3

(51) Int. Cl.
*B60W 50/00*    (2006.01)
*G01S 5/02*    (2010.01)
*G08C 17/02*    (2006.01)

(52) U.S. Cl.
CPC .......... *B60W 50/00* (2013.01); *G01S 5/0294* (2013.01); *G08C 17/02* (2013.01); *G08C 2201/91* (2013.01)

(58) Field of Classification Search
None
See application file for complete search history.

(56) References Cited

U.S. PATENT DOCUMENTS

| 2004/0121725 | A1  | 6/2004  | Matsui |
| 2007/0159349 | A1* | 7/2007  | Chang .................... G08C 17/02 340/4.3 |
| 2008/0079604 | A1* | 4/2008  | Madonna .................. G01S 5/02 340/13.24 |
| 2009/0047022 | A1* | 2/2009  | Newman ................ G08C 17/02 398/106 |
| 2009/0065578 | A1  | 3/2009  | Peterson et al. |
| 2009/0079705 | A1  | 3/2009  | Sizelove et al. |
| 2011/0021234 | A1  | 1/2011  | Tibbitts et al. |
| 2011/0105097 | A1  | 5/2011  | Tadayon et al. |
| 2011/0183601 | A1  | 7/2011  | Hannon |
| 2011/0281518 | A1* | 11/2011 | Santavicca ............ B60R 25/209 455/7 |
| 2012/0005773 | A1  | 1/2012  | Aasen et al. |
| 2012/0056715 | A1* | 3/2012  | Rajagopal .............. G08B 21/24 340/8.1 |
| 2014/0055251 | A1* | 2/2014  | Son ........................ G08C 17/02 340/12.54 |

FOREIGN PATENT DOCUMENTS

| JP | 2002-087184  | A  | 3/2002  |
| JP | 2005-335424  | A1 | 12/2005 |
| JP | 2005-354312  | A  | 12/2005 |
| JP | 2006-056393  | A  | 3/2006  |
| JP | 2006-352224  | A  | 12/2006 |
| JP | 2009-135892  | A  | 6/2009  |
| JP | 2009-154689  | A1 | 7/2009  |
| JP | 2009-177588  | A  | 8/2009  |
| JP | 2010-221893  | A1 | 10/2010 |
| WO | WO 00/17737  |    | 3/2000  |

OTHER PUBLICATIONS

Notice of Reason(s) for Refusal, Japanese Patent Application No. 2015-502321, Date of Mailing: Oct. 20, 2015, 8 pages.
International Search Report, PCT/EP2013/056509, Jun. 6, 2013, 3 pages.
Combined Search and Examination Report, Application No. GB1205674.3, May 17, 2012, 6 pages.
Notice of Reason(s) for Refusal, Japanese Patent Application No. 2015-502321, Date of Mailing: Sep. 20, 2016, 8 pages.

* cited by examiner

*Primary Examiner* — Mussa A Shaawat
*Assistant Examiner* — Kyung Kim
(74) *Attorney, Agent, or Firm* — Myers Bigel, P.A.

(57) ABSTRACT

The present invention relates to an on-board control system for a vehicle. A central control unit is provided for controlling the operation of several vehicle systems in response to a control signal transmitted wirelessly by a remote control. An interior of the vehicle is divided into a plurality of operating zones and a tracking system tracks the remote control to determine which one of said operating zones the remote control is located within. The vehicle systems are each associated with at least one of said operating zones. The remote control is configured selectively to control each vehicle system associated with the operating zone in which the remote control is located. The invention also relates to a method of operating a vehicle control system.

20 Claims, No Drawings

ON-BOARD VEHICLE CONTROL SYSTEM AND METHOD

RELATED APPLICATIONS

This application is a 35 U.S.C. §371 national stage application of PCT Application No. PCT/EP2013/056509, filed on Mar. 27, 2013, which claims priority from Great Britain Patent Application No. 1205674.3, filed Mar. 30, 2012, the contents of which are incorporated herein by reference in their entireties. The above-referenced PCT International Application was published in the English language as International Publication No. WO 2013/144,199 A1 on Oct. 3, 2013.

TECHNICAL FIELD

The present invention relates to an on-board control system; an on-board remote control and a method of operating a vehicle control system.

BACKGROUND OF THE INVENTION

It is known to provide a wireless remote control within a motor vehicle to control an infotainment system. The infotainment system can comprise multiple display modules each having a separate screen for displaying audio and/or video media. The user must manually select a channel on the remote control, for example using a slider switch or selecting an on-screen option, to select the display module to be controlled. The user must therefore check which channel is selected before using the remote control to avoid erroneous operation.

It is known to provide a remote control for controlling a variety of home entertainment systems. These systems operate on a room-by-room basis and are intended primarily for use by a single user. US 2010/018279 A1 teaches monitoring the location of a remote control via triangulation; and U.S. Pat. No. 6,563,430 B1 discloses a remote control responsive to context sensitive information (location, previous location, time of day, time of year etc.). WO 2007/067974 A2 also discloses the automatic determination of remote control location. Alternate systems are known from US20090065578A1 and US20100198690A1. These systems are unsuitable for controlling multiple systems in a single room.

It is against this background that the present invention has been conceived. Embodiments of the invention may provide a system or a method which addresses at least some of the shortfalls associated with known on-board vehicle control systems. Other aims and advantages of the invention will become apparent from the following description, claims and drawings.

SUMMARY OF THE INVENTION

Aspects of the present invention relate to an on-board control system; an on-board remote control and a method of operating a vehicle control system.

In a further aspect, the present invention relates to an on-board control system for a vehicle, the control system comprising:
  a central control unit for controlling operation of a plurality of vehicle systems;
  a remote control for transmitting a control signal wirelessly to the central control unit;
  a tracking system for tracking the position of the remote control within the vehicle;
  wherein each vehicle system is associated with at least one operating zone defined within the vehicle; the remote control being configured selectively to control each vehicle system associated with the operating zone in which the remote control is located.

The on-board control system allows location-specific control of the vehicle systems. A single remote control can be used to control different vehicle systems or to provide different control options for a vehicle system, depending on the location of the remote control. The operating zones are defined within a single enclosed space defined by the vehicle cabin. The control system can thereby be used in a multi-user environment and switch between different on-board applications based on location within the vehicle (user discrimination based on location within the vehicle). The appropriate control functions can be selected automatically based on the operating zone. Thus, it is not necessary for a user to manually select the desired control functions.

The control system can be configured to control an infotainment system, for example comprising at least one information system and at least one entertainment system. The infotainment system can comprise a plurality of display screens which can be operated independently. The remote control can be used to control one of said display screens or a combination of said display screens based on its position within the vehicle.

The remote control can comprise a display panel for displaying a control interface. The control interface can display the available control functions. The interface and commands available on the remote control could be tailored for each operating zone. The control interface can be configurable to display functionality based on the operating zone in which the remote control is located. The control interface can be customisable based on the position of the remote control within the vehicle.

The remote control can be configured to control each vehicle system associated with the operating zone in which the remote control is located. Alternatively, the central control unit could be configured to control each vehicle system associated with the operating zone in which the remote control is located.

The tracking system can utilise radio frequency (RF), ultra-sonic, computer vision or infra-red to track the remote control. The tracking system can utilise an Ultra Wide Band Real Time Location System (UWB-RTLS). The tracking system can comprise a plurality of antennae for transmitting or receiving a locating signal to track the position of the remote control. Thus, the tracking system may be operable to track the location of the remote control based on the locating signal without requiring a control signal to be transmitted by the remote control. The remote control can comprise a receiver for receiving locating signal(s) from said antennae. A distance from each antenna to the remote control can be calculated to track the position of the remote control within the vehicle. The time of flight of the locating signal can be measured to track the position of the remote control. Alternatively, signal attenuation could be measured to estimate the position of the remote control.

The operating zone or at least one of said operating zones can be defined with reference to the seating positions in the vehicle. In a vehicle having front and rear seats, the operating zones can comprise front left, front right, rear left, rear right. In a vehicle having three rows of seats, the operating zones can comprises front left, front right, middle left, middle right, rear left and rear right. Two or more operating zones can be coupled to increase the functionality of the remote control. For example, master and slave operating zones can be defined. The remote control and/or the central control unit can be configured to control one or more vehicle systems associated with a slave operating zone when the remote control is located in the master operating zone.

In a still further aspect, the present invention relates to an on-board remote control for a vehicle, the remote control comprising:
- a receiver for receiving location signals from a plurality of antennae;
- a localization measurement processor for determining the location of the remote control relative to said antennae;
- a transmitter for transmitting wirelessly a control signal for controlling vehicle systems in response to a user input;
- wherein the remote control is operable in a plurality of operating modes selected based on the position of the remote control relative to said antennae.

In a yet further aspect, the present invention relates to an on-board remote control for a vehicle, the remote control comprising:
- a transmitter for transmitting a location signal to a plurality of antennae; and
- a receiver for receiving location data to identify the position of the remote control relative to said plurality of antennae;
- wherein the remote control is operable in a plurality of operating modes selected based on the position of the remote control relative to said antennae.

The operating modes can provide location-specific functionality within the vehicle cabin. The remote control can be configured to identify an operating zone based on its location within the vehicle cabin.

The remote control described herein can be a dedicated unit for use in the vehicle. Alternatively, the remote control can be a portable electronic device, such as a cellular telephone, a smart phone, a personal satellite navigation device, or a tablet computer. Where the portable electronic device comprises a cellular telephone, said cellular telephone can execute a software application configured to select one of a plurality of operating modes based on a detected operating zone within the vehicle cabin. Selected functionality of the cellular telephone could be inhibited in certain operating modes. The ability of the cellular telephone to make or receive telephone calls or to use the short message services functions could be restricted in certain operating modes, for example if the cellular telephone is located in an operating zone associated with the driver seat. These operating modes could be bypassed if a hands-free device was in use, for example. Controlling the operation of a cellular telephone based on its location within the vehicle is believed to be independently patentable.

In a yet still further aspect, the present invention relates to a method of operating a vehicle control system based on the location of a remote control within a vehicle, a plurality of operating zones being defined within the vehicle and each of a plurality of vehicle systems being associated with at least one of said operating zones; the method comprising:
- determining the operating zone in which the remote control is located; and
- configuring the remote control selectively to control each vehicle system associated with the operating zone in which the remote control is located.

In a further aspect, the present invention relates to an on-board control system for a vehicle. A central control unit is provided for controlling the operation of several vehicle systems in response to a control signal transmitted wirelessly by a remote control. An interior of the vehicle is divided into a plurality of operating zones and a tracking system tracks the remote control to determine which one of said operating zones the remote control is located within. The vehicle systems are each associated with at least one of said operating zones. The remote control is configured selectively to control each vehicle system associated with the operating zone in which the remote control is located.

The present invention also relates to a vehicle comprising an on-board control system as described herein.

In a further aspect, the present invention relates to a method of controlling the operation of a portable electronic device, such as a cellular telephone, based on its location within a vehicle; the method comprising:
- defining a plurality of operating zones within the vehicle
- determining the operating zone in which the portable electronic device is located; and
- configuring the portable electronic device to provide functionality based on the operating zone in which the portable electronic device is located.

If the portable electronic device is a cellular telephone, the ability of the cellular telephone to make or receive telephone calls and/or to use the short message service functions could be restricted in certain operating modes. For example, these restrictions could be applied if the cellular telephone is located in an operating zone associated with a driver seat of the vehicle.

The method(s) described herein can be machine-implemented. The method(s) can be implemented on a computational device comprising one or more processors, such as an electronic microprocessor. The processor(s) can be configured to perform computational instructions stored in memory or in a storage device. The device described herein can comprise one or more processors configured to perform computational instructions.

In a further aspect the present invention relates to a computer system comprising: programmable circuitry; and software encoded on at least one computer-readable medium to program the programmable circuitry to implement the method described herein.

According to a still further aspect the present invention relates to one or more computer-readable media having computer-readable instructions thereon which, when executed by a computer, cause the computer to perform all the steps of the method(s) described herein.

Within the scope of this application it is envisaged that the various aspects, embodiments, examples and alternatives, and in particular the individual features thereof, set out in the preceding paragraphs, in the claims and/or in the following description and drawings, may be taken independently or in any combination thereof. For example, features described in connection with one embodiment are applicable to all embodiments, unless such features are incompatible.

DETAILED DESCRIPTION OF AN EMBODIMENT

The present invention relates to a location aware remote control for use in a motor vehicle to selectively control in-vehicle-infotainment (IVI) systems.

The vehicle has an IVI system comprising an information system and an entertainment system. The information system and the entertainment system are coupled to an on-board central control unit for controlling the infotainment system. The central control unit comprises a processor and a media storage device. The media storage device can comprise one or more of the following: a hard disc, solid state memory or an optical drive (for reading DVDs or Blu-ray discs). The media storage device could be a portable media device, such as a personal audio or video device, which is removably connected to the central control unit.

The information system comprises a first display positioned in the centre console at the front of the vehicle for viewing by the driver and a front seat passenger. In use, the information display selectively displays, for example, vehicle operating parameters and a satellite navigation system.

The entertainment system comprises second and third displays mounted on the back of the left and right headrests respectively of the front seats. In use, the entertainment system can output media, such as video images and audio. The second and third displays are operable independently of each other, thereby enabling different media to be displayed simultaneously on the second and third displays.

The information system and the entertainment system can both be controlled by the same wireless remote control in accordance with the present invention. The remote control comprises a wireless transceiver for communicating with the central control system; and a display screen for displaying a user interface. In use, the remote control transmits a control signal for controlling the information and entertainment systems. The remote control comprises a battery which can be re-charged by docking the remote control in an on-board docking station.

A tracking system is provided for tracking the location of the remote control within the vehicle using a localization measurement system. The present embodiment utilises an Ultra Wide Band Real Time Location System (UWB-RTLS) but other techniques, such as ultra-sonics, infra-red or another local positioning system (LPS) could be used to track the remote control. The tracking system comprises a receiver provided in the remote control for receiving a locating signal from a plurality of antennae (three in the present embodiment) spaced apart from each other around the vehicle. The receiver triangulates the position of the remote control by measuring the time-of-flight of radio frequency (RF) transmissions from the antennae. The position of the receiver relative to the antennae can be calculated to determine the location of the remote control within the vehicle cabin.

The vehicle cabin is divided into several operating zones. The operating zones in the present embodiment are each defined with reference to one or more seats in the vehicle. A front left operating zone is defined for the front left seat; a front right operating zone is defined for the front right seat; a rear left operating zone is defined for the rear left seat; and a rear right operating zone is defined for the rear right seat. Moreover, the infotainment systems are each associated with one or more of said operating zones. For example, the first display of the information system is associated with the front left and front right operating zones; and the second and third displays of the entertainment system are associated with the respective rear left and rear right operating zones. The remote control automatically determines the applicable operating zone based on its position with the vehicle, calculated using the localization measurement system described above.

The remote control has a plurality of operating modes which define the functionality of the remote control. The operating modes of the remote control are selected based on the operating zone in which the remote control is located. The functionality of the remote control is thereby based on its location within the vehicle cabin. The remote control automatically configures the user interface to display functions relevant to the selected operating mode. For example, the user interface can display video control functions (such as play, pause, rewind and fast forward) when the remote control is configured to control the entertainment system; and information control functions (such as satellite navigation controls) when the remote control is configured to control the information system.

The present invention thereby enables location-specific functionality for the remote control within the vehicle cabin. When the remote control is located in the front of the vehicle cabin, it is configured to control the first display of the information system. When the remote control is located in the rear left operating zone, it is configured to control the second display of the entertainment system (mounted on the left side of the vehicle). Similarly, when the remote control is located in the rear right operating zone, it is configured to control the third display of the entertainment system (mounted on the right side of the vehicle).

The remote control can be configured to control infotainment systems in other operating zones within the vehicle cabin. The appropriate operating mode could be selected manually, for example in an over-ride function. Alternatively, a master/slave arrangement could be defined for particular operating zones. The remote control could be configured to allow control of the second and third displays from a front seat of the vehicle. For example, an adult in the front passenger seat might want to control the entertainment system for a young child in the back seat. This functionality could be implemented by defining the infotainment systems associated with particular operating zones.

The IVI system has been described as comprising an information system associated with the first display. However, it will be appreciated that the first display can also be configured to function as an entertainment system, for example to display video media and/or internet functions. The entertainment system could be engaged only when the vehicle is stationary, for example. Alternatively, the first display could comprise a dual-view screen configurable to display different information simultaneously to the driver and the front seat passenger. While the vehicle is being driven, the dual-view screen can display entertainment media visible only by the front seat passenger. The dual-view screen can simultaneously display vehicle information, such as a satellite navigation map, visible only by the driver. The remote control according to the present invention can be used to control the different entertainment and information applications on the first display. The operating mode of the remote control can be determined based on whether it is in the front left or front right operating zone.

The remote control described herein can be used to navigate through system menus or control system features, such as audio volume and display settings. The remote control can control the output of audio and video media, for example to fast forward, rewind, pause and skip music tracks. Equally, the remote control can be used to interact with online services provided over the internet.

It will be appreciated that various changes and modifications can be made without departing from the scope of the present invention. For example, the remote control according to the present invention has been described as comprising a receiver for receiving signals transmitted from the antennae. The tracking system could be modified such that the antennae detect a signal transmitted from the remote control to determine the location of the remote control. The central control unit could be configured to transmit location data to the remote control to enable selection of the appropriate operating mode.

The technique of dividing the vehicle into a plurality of operating zones could have other applications. The call and SMS functions of a cellular telephone could be inhibited when it is located in pre-defined operating zones, for example associated with a driver seat of the vehicle.

The invention claimed is:

1. An on-board control system for a vehicle, the control system comprising:
   a central control unit configured to control operation of a plurality of vehicle systems;
   a remote control configured to wirelessly transmit a control signal to the central control unit; and
   a tracking system configured to track a position of the remote control within the vehicle;
   wherein each vehicle system is associated with at least one operating zone defined within the vehicle, the remote control configured to selectively control each vehicle system associated with an operating zone in which the remote control is located.

2. The on-board control system of claim 1, wherein at least one of the remote control and the central control unit is configured to control each vehicle system associated with the operating zone in which the remote control is located.

3. The on-board control system of claim 1, wherein the tracking system comprises a plurality of antennae configured to transmit and/or receive a locating signal to track the position of the remote control.

4. The on-board control system of claim 3, wherein a distance from each antenna to the remote control is calculated to track the position of the remote control within the vehicle.

5. The on-board control system of claim 3, wherein a time of flight of the locating signal is measured to track the position of the remote control.

6. The on-board control system of claim 3, wherein the tracking system utilises an Ultra Wide Band Real Time Location System (UWB-RTLS).

7. The on-board control system of claim 1, wherein at least one operating zone is defined with reference to one or more seats provided in the vehicle.

8. The on-board control system of claim 1, wherein master and slave operating zones are defined, and wherein at least one of the remote control and the central control unit is configured to control one or more vehicle systems associated with a slave operating zone when the remote control is located in the master operating zone.

9. The on-board control system of claim 1, wherein the remote control comprises an interface configurable to provide functionality based on the operating zone in which the remote control is located.

10. The on-board control system of claim 1, wherein the remote control comprises a receiver configured to receive a control signal from the central control unit.

11. The on-board control system of claim 1, wherein the plurality of vehicle systems comprises at least one entertainment system and/or at least one on-board information system.

12. A vehicle comprising an on-board control system of claim 1.

13. An on-board remote control for a vehicle, the remote control comprising:
    a receiver configured to receive location signals from a plurality of antennae;
    a localization measurement processor configured to determine a location of the remote control relative to said antennae;
    a transmitter configured to wirelessly transmit a control signal for controlling vehicle systems in response to a user input;
    wherein the remote control is operable in a plurality of operating modes selected based on a position of the remote control relative to said antennae.

14. The on-board remote control of claim 13, wherein the operating modes provide location-specific functionality within a vehicle cabin.

15. The on-board remote control of claim 13, wherein the remote control is configured to identify an operating zone based on its location relative to said antennae.

16. An on-board remote control for a vehicle, the remote control comprising:
    a transmitter configured to transmit a location signal to a plurality of antennae and to transmit a control signal to a central control unit of an on-board control system of the vehicle; and
    a receiver configured to receive location data to identify a position of the remote control relative to said plurality of antennae;
    wherein the remote control is operable in a plurality of operating modes selected based on the position of the remote control relative to said antennae, wherein each operating mode is associated with a respective one of a plurality of vehicle systems controlled by the central control unit, and wherein the remote control is configured to output a control signal for controlling a vehicle system in dependence on a selected operating mode.

17. The on-board remote control of claim 16, wherein the operating modes provide location-specific functionality within a vehicle cabin.

18. The on-board remote control of claim 16, wherein the remote control is configured to identify an operating zone based on its position relative to said antennae.

19. The on-board remote control of claim 16, wherein the transmitter is an ultra-wide band transmitter and the receiver is an ultra-wideband receiver.

20. The on-board remote control of claim 19, wherein the locating signal is an ultra-wideband signal.

* * * * *